(12) United States Patent
Stoller

(10) Patent No.: US 8,299,420 B2
(45) Date of Patent: Oct. 30, 2012

(54) NEUTRON SHIELDING FOR DOWNHOLE TOOL

(75) Inventor: Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/758,929

(22) Filed: Apr. 13, 2010

(65) Prior Publication Data

US 2010/0193675 A1  Aug. 5, 2010

Related U.S. Application Data

(63) Continuation of application No. 12/435,438, filed on May 5, 2009.

(30) Foreign Application Priority Data

May 16, 2008  (EP) ...................................... 08290461

(51) Int. Cl.
 *G01V 5/10* (2006.01)
 *G01V 5/04* (2006.01)
 *G01V 5/00* (2006.01)

(52) U.S. Cl. .................. 250/269.4; 250/269.1; 250/253; 250/254; 250/267

(58) Field of Classification Search ....... 250/253–269.8, 250/506.1, 515.1, 390.01, 390.04, 269.1–269.8, 250/515, 257, 267, 265, 266, 505.1, 507.1, 250/518.1
See application file for complete search history.

(56) References Cited

U.S. PATENT DOCUMENTS

| | | | |
|---|---|---|---|
| 2,778,950 A | | 1/1957 | Frey, Jr. et al. |
| 4,055,763 A | * | 10/1977 | Antkiw ...................... 250/269.8 |
| 4,631,405 A | * | 12/1986 | Smith, Jr. ...................... 250/266 |
| 5,097,123 A | * | 3/1992 | Grau et al. .................. 250/269.7 |
| 5,440,118 A | | 8/1995 | Roscoe |
| 5,804,820 A | * | 9/1998 | Evans et al. ................. 250/269.6 |
| RE36,012 E | | 12/1998 | Loomis et al. |
| 6,373,248 B1 | * | 4/2002 | Poitzsch et al. ............... 324/303 |
| 2002/0170348 A1 | | 11/2002 | Roscoe et al. |
| 2006/0192096 A1 | * | 8/2006 | Radtke et al. .............. 250/269.2 |
| 2010/0230585 A1 | | 9/2010 | Zhang et al. |

FOREIGN PATENT DOCUMENTS

| | | |
|---|---|---|
| FR | 2883596 | 2/2006 |
| WO | 96/08733 | 3/1996 |
| WO | 9608733 | 3/1996 |

* cited by examiner

*Primary Examiner* — David Porta
*Assistant Examiner* — Yara Green
(74) *Attorney, Agent, or Firm* — Stephanie Chi; Darla Fonscca; Brigitte Jeffery Echols

(57) ABSTRACT

A downhole tool for performing measurement of a formation. The tool comprising a housing surrounding a source for generating neutrons and a detector for detecting the neutrons. A shield is located outside of, or embedded in, the housing and focuses the neutrons.

20 Claims, 8 Drawing Sheets

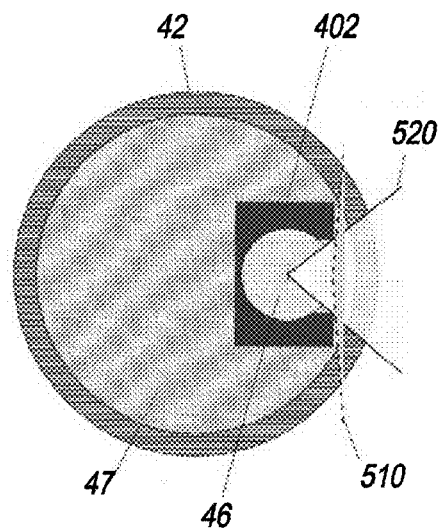
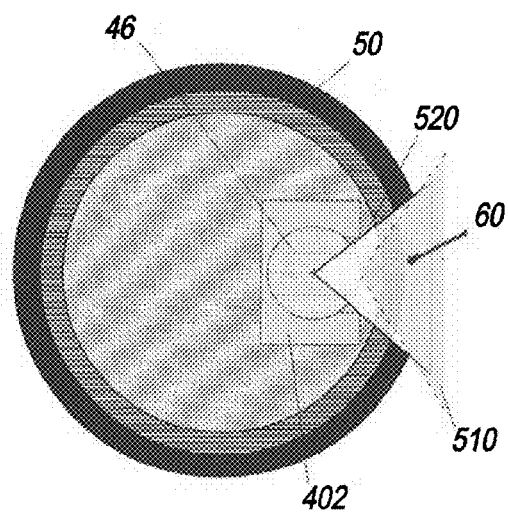
FIG.5a  FIG.5b
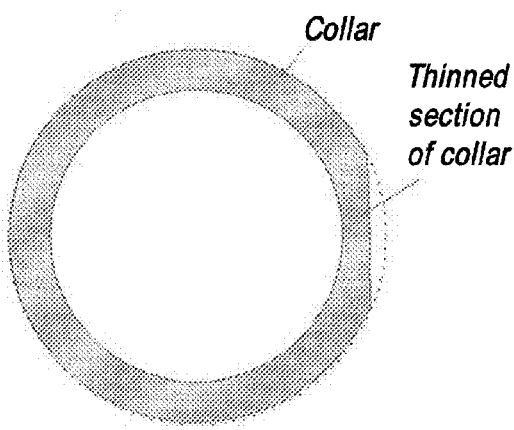
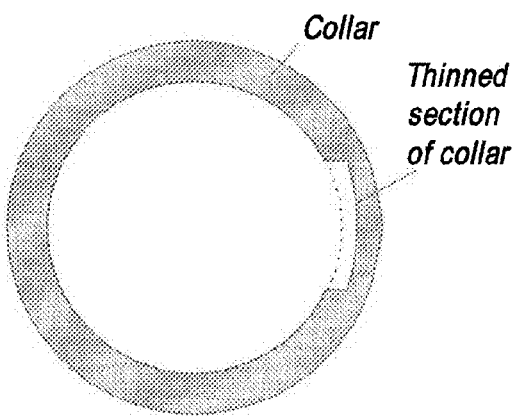
FIG.5c  FIG.5d

US 8,299,420 B2

NEUTRON SHIELDING FOR DOWNHOLE TOOL

CROSS REFERENCE TO RELATED APPLICATIONS

This application is a continuation of Ser. No. 12/435,438 filed May 5, 2009.

FIELD OF THE INVENTION

The present invention relates to shielding and in particular, but not exclusively, to neutron shielding for downhole tools.

BACKGROUND OF THE INVENTION

Neutron tools are used widely in the petrochemical industry, particularly during the so-called LWD (Logging While Drilling) stage or during wireline logging after the well has been drilled. Logging while drilling is performed during the initial stage of drilling a hole down into the earths crust towards an identified hydrocarbon reservoir, which should eventually form a producing oil or gas well for fulfilling our energy needs.

Although various surface techniques exist for characterizing subsurface formations, it is useful to use subsurface techniques for more accurate localized measurements of the surrounding rock formations. This becomes even more useful the deeper the drill progresses. In the case of LWD, the measurement or logging of such data as one progresses down the well, is useful in making more up-to-the-minute estimates as to whether the hydrocarbon reservoir is of sufficient quality to make it economically feasible for production. It also helps in deciding on the optimal location in the hydrocarbon formation to stop the drilling or change its direction and to decide on when to set the casing.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment comprises a logging-while-drilling (LWD) module 120, a measuring-while-drilling (MWD) module 130, a rotary-steerable system and motor 150, and drill bit 105. The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device or neutron tool to measure, for example, the porosity of the surrounding formation.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

FIG. 2 shows a logging-while-drilling nuclear device as disclosed in U.S. Pat. Re. 36,012, incorporated herein by reference, which utilizes an accelerator-based source, it being understood that other types of nuclear LWD tools can also be utilized as the LWD tool 120 or part of an LWD tool suite 120A. In FIG. 2, a drill collar section 1040 is shown as surrounding a stainless steel tool chassis 1054. Formed in the chassis 1054 to one side of the longitudinal axis thereof (not visible in this view) is a longitudinally extending mud channel for conveying the drilling fluid downward through the drill string. Eccentered to the other side of the chassis 1054 are a neutron accelerator 1058, its associated control and high voltage electronics package 1060 and a coaxially aligned near-spaced detector 1062. The near-spaced detector 1062 is primarily responsive to accelerator output with minimum formation influence. The detector 1062 is surrounded, preferably on all surfaces except that adjacent to the accelerator 1058, by a shield 1064 of combined neutron moderating-neutron absorbing material. The output of the near detector 1062 is used to normalize other detector outputs for source strength fluctuation. Located longitudinally adjacent to the near-spaced detector 1062 is a plurality or array of detectors, of which 1066a and 1066d are shown in this view. The detector 1066a is back-shielded, as shown at 1068a. The array includes at least one, and preferably more than one, epithermal neutron detector and at least one gamma ray detector, represented in this example at 1084, with shield 1086. One or more thermal neutron detectors can also be included. The above-referenced U.S. Pat. Re. 36,012 can be referred to for further details. The detector signals can be utilized to determine, inter alia, formation density, porosity, and lithology.

So-called neutron tools are used for measuring the porosity of the surrounding rock formations and hence, estimating the hydrocarbon (oil or gas) content. The neutron tools have a source responsible for generating neutrons and irradiating the surrounding rock formation with neutrons. Rock formations with a high porosity indicate a fluid such as a hydrocarbon in the formation.

Neutron porosity measurements rely on the fact that hydrogen is an excellent moderator of fast neutrons. The presence of hydrogen (water or oil) in the porespace of rock changes the average distance traveled by neutrons. If the flux of thermal neutrons is measured at an axial distance from the source, it will decrease with increasing hydrogen content and therefore with increasing liquid filled porosity.

Most neutron tools have neutrons arriving from all directions in which there is little or no focusing applied. In this context focusing means limiting the angular and/or vertical extent of the solid angle into which a source can emit radiation or from which a detector can accept radiation. A reason for this is the relatively low power of traditional neutron sources and thus by detecting neutrons from all directions, measurement statistics are enhanced. However, this configuration results in increased sensitivity of the tool to the borehole, i.e. neutrons scattered from the borehole, and not from the formation. This makes the neutron tools unsuited for borehole imaging applications, which have been developed for LWD tools.

The multiple scattering that neutrons typically undergo, not only in the formation but also in the tool before arriving at the detector, reduces the azimuthal sensitivity to the actual formation under investigation.

Some tools have tried to enhance the sensitivity to neutrons from the formation, as compared to the borehole, by eccentering the tool against the formation wall with an eccentering device, typically a bowspring as shown in FIG. 3 for the case of a wireline or slickline tool. It is also possible to position the detectors and in some cases also the neutron source eccentered in the tool to try be more sensitive to neutron scattering deriving from the formation. Another technique is to try backshield the detectors inside the tool housing to reduce the effect from neutron scattering in the borehole and more importantly the mud channel.

In downhole environments it is often not desirable to have eccentering devices and positioning mechanisms that complicate the tool. Backshielding is not an option on smaller tools, which do not have room behind the detectors to accommodate any shielding.

SUMMARY OF THE INVENTION

According to a first aspect of the invention there is provided a downhole tool for performing measurement of a formation, the tool comprising: a housing having a source for generating neutrons and a detector for detecting the neutrons; and a shield for focusing the neutrons and located outside of, or embedded in, the housing.

This configuration enables azimuthal focusing. By having an opening in the shield that is located outside of, or embedded, in the housing means less scattering for example in LWD applications in which the neutrons were scattered in the relatively thick collar before entering the detector.

Preferably, wherein the shield is located around the detector. Alternatively, wherein the shield is located around the source. Alternatively, there is shielding located around both the detector and the source.

Preferably, wherein the azimuthal focusing increases the sensitivity of the tool to the measured formation and mitigates mud-channel or borehole effects, which may be further negated by backshielding.

Alternatively, wherein the azimuthal focusing is directed to both the formation and borehole so that the tool is able to obtain a complete image on the outside of the tool.

Preferably, wherein the shield is capable of focusing a flow of gamma-rays from the formation to the detector.

Preferably, wherein there are a plurality of detectors having corresponding focusing windows in the shield. Preferably wherein at least some of the detectors are aligned in the same azimuthal direction.

Preferably, wherein a further axial neutron shield is arranged to prevent neutrons from flowing directly from the source to the detector. This forces the majority of generated neutrons to be scattered into the formation.

According to yet a further aspect of the invention there is method for focusing neutrons of a downhole tool measuring a formation, the method comprising: generating neutrons with a source located in a housing of the tool; detecting neutrons with a detector in the housing; and focusing the neutrons with a shield, wherein the shield is located outside of, or embedded in, the housing.

According to yet a further aspect of the invention there is provided a downhole tool for performing measurement of a formation, the tool comprising: a housing having a source for generating neutrons and a detector for detecting the neutrons; and an outer shield located outside of, or embedded in, the housing and around the source, the outer shield having an opening for focusing neutron flow in an azimuthal direction.

According to yet a further aspect of the invention there is provided a downhole tool for performing measurement of a formation, the tool comprising: a housing having a source for generating neutrons and a detector for detecting the neutrons; and an outer shield located outside of, or embedded in, the housing and around the detector, the outer shield having an opening for focusing neutron flow in an azimuthal direction.

According to yet a further aspect of the invention there is provided a downhole tool for performing measurement of a formation, the tool comprising: a housing surrounding a source for generating neutrons and a detector for detecting the neutrons; a first shield having an opening for an azimuthal focusing of the neutrons from outside of the tool to the detector; and a second shield having an opening for an azimuthal focusing of the neutrons from the source to outside of the tool.

According to yet a further aspect of the invention there is provided a downhole tool for performing measurement of a formation, the tool comprising: a housing surrounding a source for generating neutrons and a detector for detecting the neutrons; a first shield located within the housing between the source and the detector for preventing a flow of the neutrons from the source directly to the detector; a second shield for focusing a flow of neutrons from the formation to the detector; and a third shield for focusing a flow of neutrons from the source to the formation.

Preferably, wherein the source is neutron source and the detector is a gamma-ray detector. Preferably, wherein the first shield is made from a material that provides shielding against neutrons and gamma rays. Preferably, wherein the material is tungsten.

According to a further aspect of the invention there is provided a method for focusing neutrons of a downhole tool measuring a formation, the method comprising: generating neutrons with a source located in a housing of the tool; detecting neutrons with a detector in the housing; preventing, with a first shield, a flow of neutrons directly between the source and the detector; and focusing, with a second shield, the flow of neutrons exiting the tool and with a third shield the flow of neutrons returning to the tool in such a way as to obtain enhanced azimuthal and vertical resolution. Such enhanced resolution can be used for the purpose of imaging the formation surrounding the borehole as well as enhancing the sensitivity of the measurement to the formation properties when the tool is facing the formation.

According to yet a further aspect of the invention there is provided a downhole tool for performing measurement of a formation, the tool comprising: a housing having a source for generating neutrons and a detector for detecting gamma-rays, a first shield located between the source and the detector for preventing the flow of neutrons from the source and the flow of gamma-rays generated by said neutrons near the source to the gamma-ray detector and a second shield located around the source having a window for focusing the neutron flow in a well defined azimuthal direction.

Shielding of the source ensures that neutron flux flows towards a preferred azimuthal direction ensuring improved efficiency and accuracy of the downhole tool to the formation (or the borehole) by determining the response only from a preferred azimuthal direction.

The azimuth of the window focusing the flux of neutrons from the source to the formation should preferably be the same as the azimuth of the window allowing the returning neutrons to enter the tool into the detector(s).

The vertical extent of the window over the neutron detector can be limited to enhance the vertical resolution of the measurement.

According to yet a further aspect of the invention there is provided a downhole tool for performing measurement of a formation, the tool comprising: a housing having a source for generating neutrons and a detector for detecting the gamma-rays induced by the neutrons interacting in the formation; and a shield located outside of, or embedded in, the housing and around the source, the outer shield having an opening for focusing neutron flow in an azimuthal direction Preferably, wherein the tool further comprising a second detector for detecting the neutrons directly.

BRIEF DESCRIPTION OF THE DRAWINGS

Embodiments of the present invention will now be described by way of an example with reference to the accompanying drawings, in which:

FIG. 5a shows a prior art tool using inside shielding to focus the flux of neutrons;

FIG. 5b shows an embodiment of the invention using outside shielding;

FIG. 5c shows an embodiment of the invention with reduced thickness of the housing under the window;

FIG. 5d shows an embodiment of the invention with reduced thickness of the housing under the window on the inside of the tool housing;

SPECIFIC DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The term 'embedded' means that shielding material is contained in a cut-out of the collar or housing material such the shield lies flush with the rest of the tool housing or collar. Since there are no projections from the tool surface the fluid flow over such a flush profile is not disturbed. Also, the general maneuverability of the tool within the borehole is improved by having a constant cylindrical profile.

The term 'azimuthal' is understood in downhole drilling and well logging to mean at an angle. Specifically, it can be seen from FIGS. 5a and 5b that there is an angular focusing of the neutron flux from a section of the formation, which is typically known as azimuthal focusing. The 'neutron flux' is the direction of focusing the neutrons.

Figure 1:
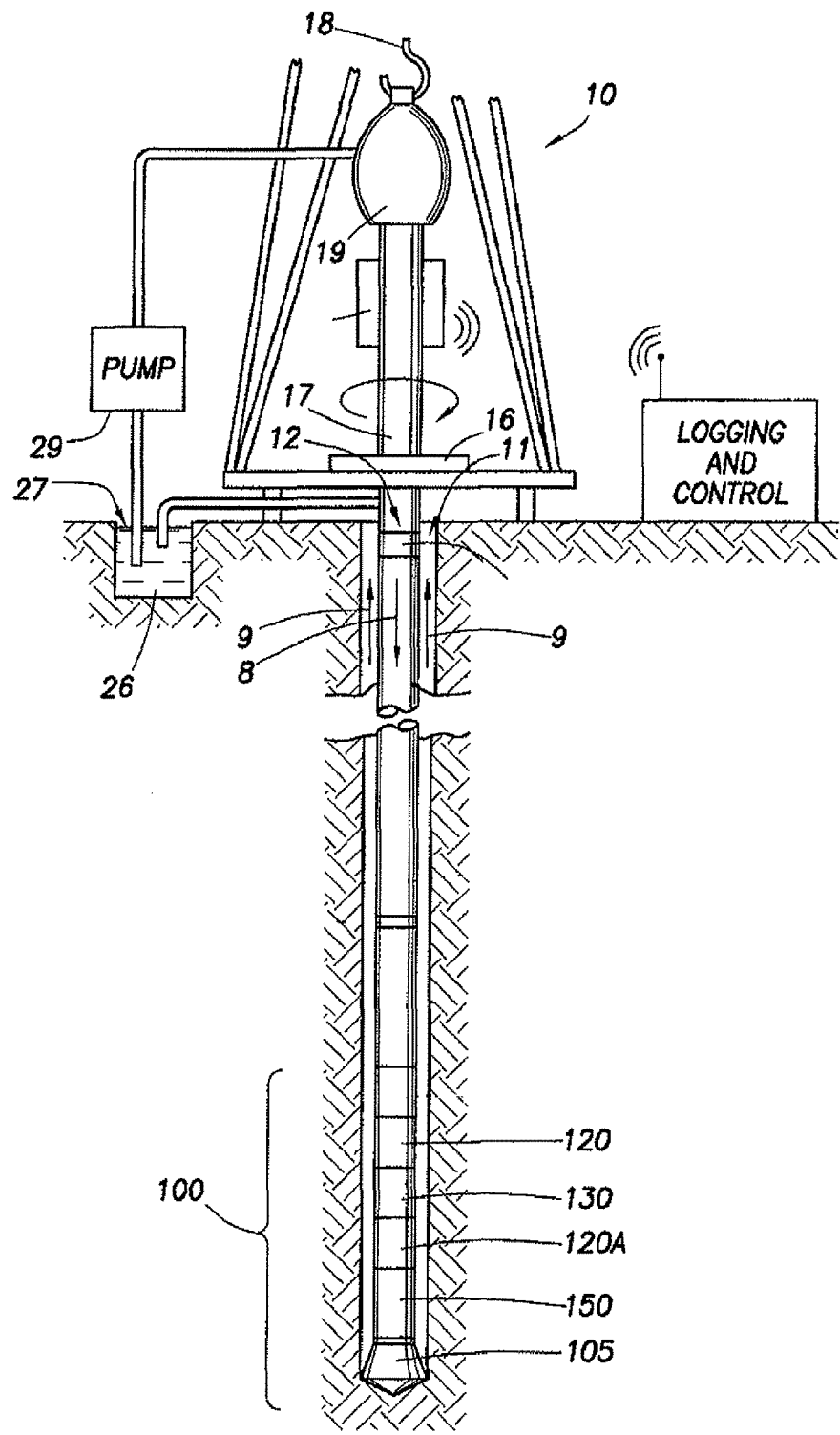
FIG. 1 shows a wellsite system in which an embodiment of the present invention can be employed.
Figure 2:
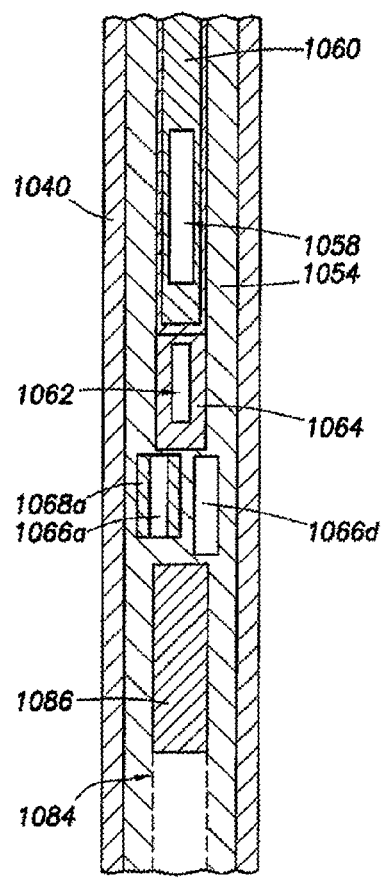
FIG. 2 shows a tool in which an embodiment of the invention can be employed.
Figure 3:
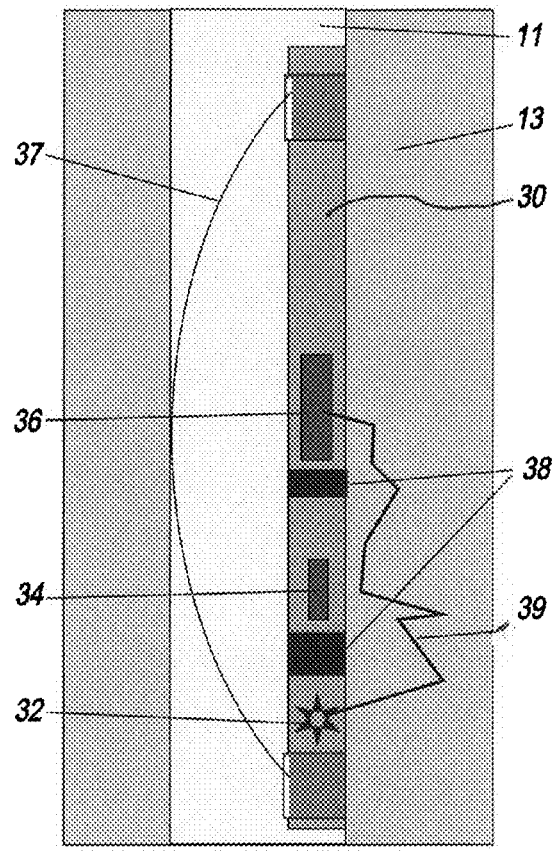
FIG. 3 shows an example of a neutron tool.

FIG. 3 shows an example of a wireline neutron tool, also referred to as a CNL (Compensated Neutron Logging) tool. The CNL tool 30 is shown located downhole in a borehole 11 surrounded by a measured formation 13. It should be appreciated that an equivalent while drilling tool (e.g. ADN) could be located at the position of the LWD tool 120 or the MWD tool 130 on the drillstring or elsewhere if desired.

The CNL tool 30 contains a neutron source 32 and two detectors, i.e. a near neutron detector 34 and a far neutron detector 36. Typically the source 32 is an AmBe (Americium Beryllium) source. However, other sources like $^{252}$Cf and electronic sources producing neutrons through fusion reactions (e.g. d-D and d-T) can be used as well. The thermal and epithermal neutrons are detected by neutron detectors (mostly $^3$He-tubes that detect the flux of thermal and/or epithermal neutrons). Other detectors such as Li-glass, suitable semiconductor detectors or $^{10}$B containing scintillators etc. can be used as well.

There is axial shielding 38 located between the detectors 34, 36 and the source 32 to prevent direct passage or flow of neutrons between the source and detectors. Instead, neutrons scattering is forced into the formation along the exemplary path 39 shown. Specifically, the neutrons from the source are slowed down depending on the formation parameters that are encountered in the formation and migrate to the far detector 36 as shown.

Embodiments of the present invention propose additional shielding configurations that achieve enhanced formation azimuthal focusing and formation sensitivity and/or to achieve enhanced imaging capabilities and vertical resolution.

In the past the use of strong shielding was hampered by the limited neutron output of the (chemical) sources and the impact of the shielding on the counting statistics. As powerful electronic neutron generators are finding their way into more logging tools and in particular, into LWD tools, the higher neutron output makes it possible to optimize shielding and therefore azimuthal and vertical sensitivity.

In wireline tools a bowspring as shown in FIG. 3 can be used to eccenter a tool; whereas in LWD tools, and to a lesser extent in some wireline tools, a degree of azimuthal sensitivity is achieved because the detectors and in some cases also the neutron source are eccentered in the tool. Instead the azimuthal sensitivity of an embodiment of the invention can be enhanced by shielding the back and the sides of the detector against the neutron flux. This can be achieved by using neutron absorbing and also neutron moderating materials.

Figure 4:
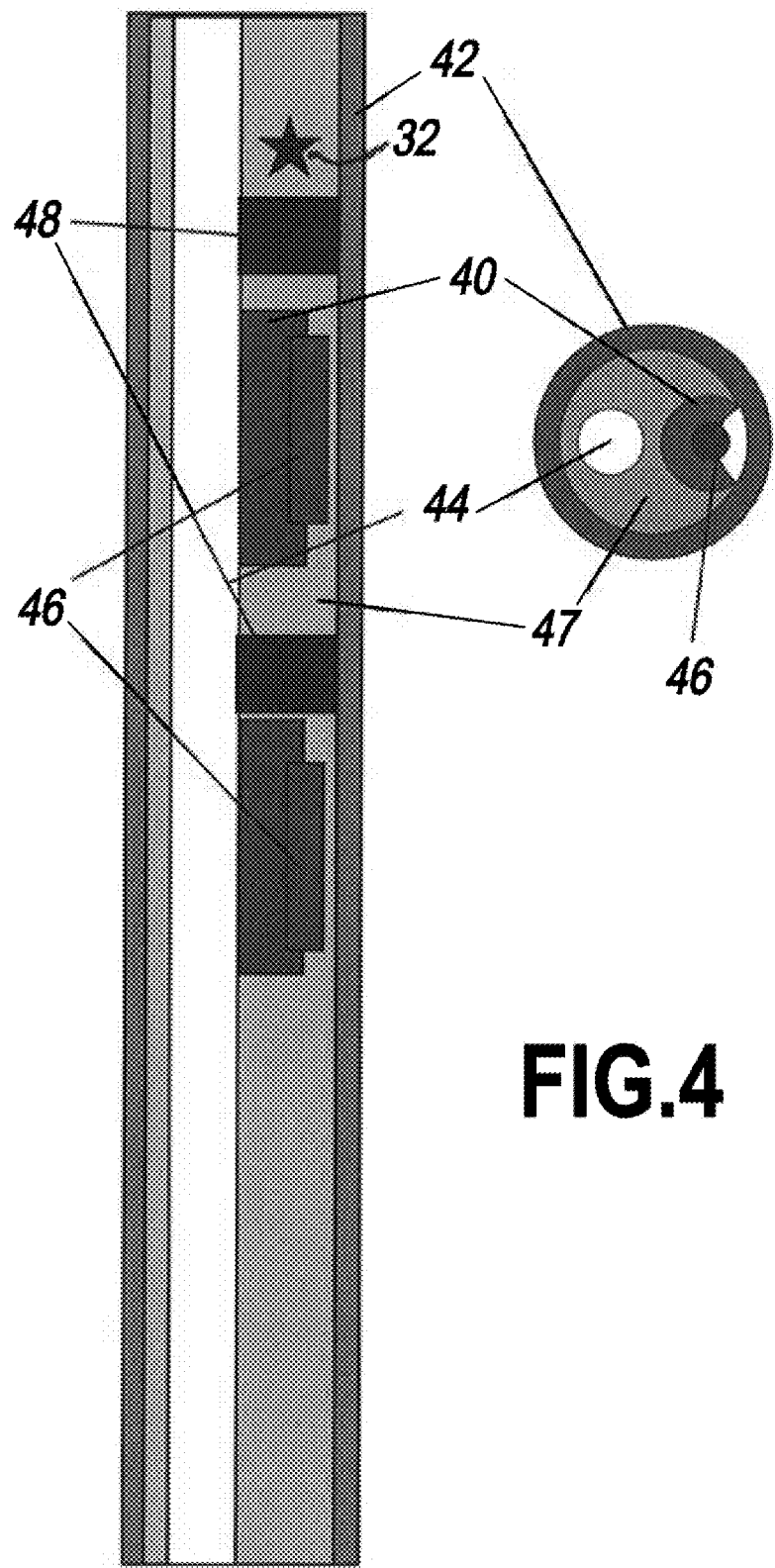
FIG. 4 shows a prior art tool in which backshielding is used.

An example of internal detector backshielding as used in the prior art is shown in Specifically, FIG. 4. Specifically, FIG. 4 shows a cross-section view alongside a plan view of an LWD neutron porosity tool having an off-center mud-channel. The shielding 40 prevents neutrons from flowing to the backside of the detector. Specifically, the backshielding 40 prevents any neutrons having traveled through the mud channel from getting to the detector. Specifically the downhole tool comprises a collar or housing 42 which surrounds the tool. Within the collar 42 is contained an axial source and neutron detector 46. There is also a mud channel 44 which is shown to extend longitudinally within the housing of the tool either through a hole in the chassis or through a separate flow tube. The tool has a chassis 47 and axial shielding 48 for preventing flow of the neutrons from the source 43 directly to the detectors 46. The chassis 47 is the internal structure within the housing (wireline) or collar (LWD) of the tool that holds most of the internal electronic components and sensor in place.

The focusing at the front of the tool facing the formation is affected by neutrons being scattered in the (thick) collar surrounding the chassis before entering into the front of the detector. The focusing is improved by locating a further neutron shield either outside the collar (i.e. on the outer surface of the collar) or embedded in the collar. This location of the further neutron shield with a strategically positioned window reduces the axial and azimuthal solid angle, which is open for neutrons. The neutron shield surrounds the detector section almost entirely leaving only an opening with a predetermined azimuthal and vertical opening without shielding. This opening forms a window for the neutrons to enter the tool and detector and focus the incoming neutron flux.

Figure 5E:
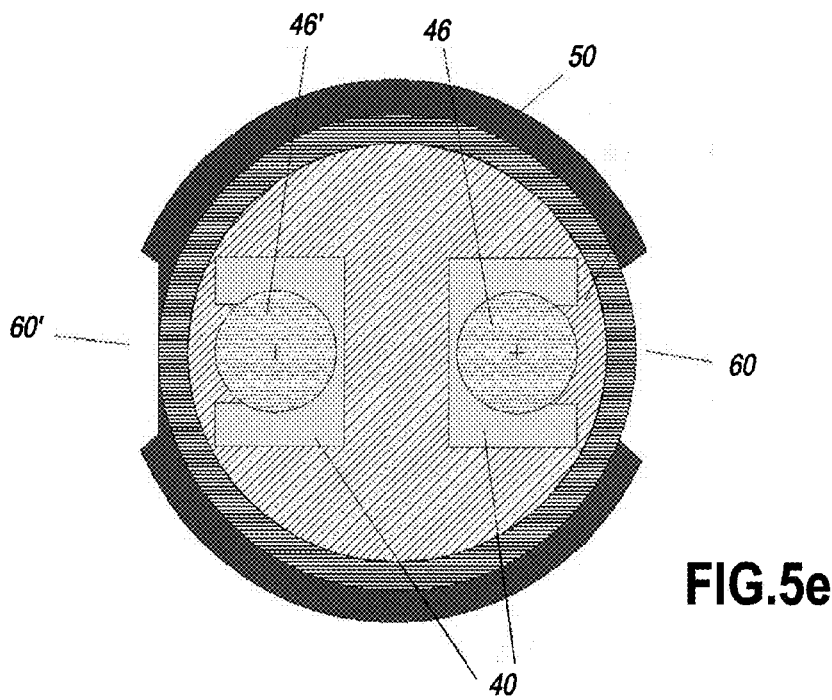
FIG. 5e shows an embodiment of the invention with two windows in the housing corresponding to two different detectors.

It should be appreciated that more than one window could be cut in the shielding either axially or azimuthally to provide focusing for more detectors, which could be placed in different axial or azimuthal positions. Multiple detectors could be replaced by fewer position sensitive neutron detectors (either radially position sensitive or axially position sensitive). A possible embodiment with two detectors is shown in FIG. 5e.

FIGS. 5a to 5e shows various plan views of the housing or collar.

Specifically, FIG. 5a shows prior art focusing of the incoming neutron flux by shielding the detector inside of the housing. The neutron flux is poorly focused by the window in the internal shielding. That is the internal shielding 402 surrounds the detector inside of the housing 42 in such a manner as to provide a very wide azimuthal opening at the front of the detector 510. The azimuthal focusing from the centre of the detector is shown at 520.

The improvement obtained by using external shielding according to an embodiment of the invention is shown in FIG. 5b, which yields substantially improved focusing. Specifically as the shielding 50 is moved farther away from the detector the focusing becomes tighter in particular for the front of the detector, which see very little focusing if the shielding is only internal.

FIGS. 5c and 5d show enhancements to the embodiment indicated in FIG. 5b by reducing the thickness of housing under the opening or window 60 in the outer shield 50. The thicker the housing the more neutrons are scattered, which is a particularly problematic in LWD applications in which a thick housing or collar is typically used.

Specifically, in FIG. 5c the housing thickness is reduced from the outside of the housing to enhance the flux of neutrons entering the detector. This reduced collar thickness is in addition to the effects of the opening in the shielding that focus the neutron passage to the detector. That is, the housing or collar thickness is reduced to further facilitate the passage of the neutrons and reduce scattering.

FIG. 5d shows a reduction of the housing thickness from the inside of the housing. While the reduction in thickness on the inside is more difficult to accomplish, it is preferable, as it does not have to be filled since it is not exposed to the borehole fluid.

It should be appreciated that the opening in the shielding material that focuses the neutron flux and also any outside thickness reduction (window) in the collar or housing, will typically be filled with a material that has only a small propensity to scatter or absorb the neutrons of interest. In this way the neutron transport close to the tool is independent of the borehole fluid, which would otherwise fill the opening during logging.

FIG. 5e shows an embodiment of the tool having two windows 60 and 60' in the outer shield 50. Each window enables the separate azimuthal focusing of the flow of neutrons to the corresponding detector. For example, window 60 enables neutrons to be focused from the formation (not shown) to the front of the detector 46, whereas window 60' enables neutrons to be focused from the borehole (not shown) to the front of the detector 46'.

FIG. 6 shows possible embodiments of the invention for improving azimuthal focusing.

Figure 6A:
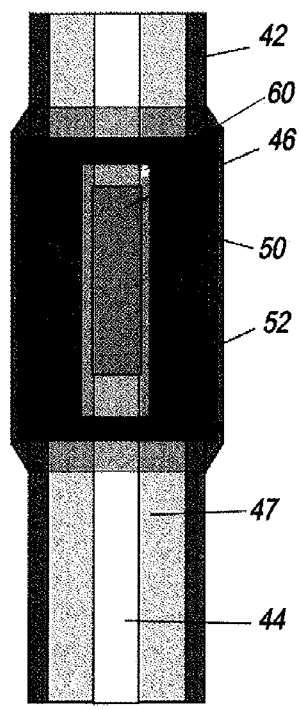
FIG. 6a shows an embodiment of detector shielding located outside the housing.

Specifically, FIG. 6a shows a cross-section view of an embodiment of the invention in which a neutron shield 50 is located outside of the collar of the tool and having a window 60 for focusing neutron flux to be received from the formation. In this embodiment there is also shown a protective cover 52 overlying the neutron shield 50. The protective cover 52 is made of a material for resisting abrasion against the borehole wall so as to protect the underlying neutron shield material. The cover 52 can be welded over the shielding 50 or bolted thereto, so that the protective cover can be replaced if it is worn.

Any neutron absorber can be used to form the neutron shield 50. Suitable materials are Boron (in particular enriched $^{10}$B, either in metallic form or as a compound such as $B_4C$), Lithium (compounds enriched with $^6$Li), Cadmium or Gadolinium. Layers or mixtures of the absorbers can be envisaged to obtain a better control of the neutron spectrum. The list of absorbers is not exhaustive. In some applications the use of $^{10}$B and $^6$Li may be preferred due to the fact that the dominant capture reaction in $^{10}$B only produces a low energy gamma-ray and the $^6$Li capture reaction does not produce any gamma-rays. This may be of particular importance if the tool also contains detectors to measure the neutron induced gamma-rays from the formation.

The protective cover 52 on the other hand should have slightly different properties in being relatively transparent to neutrons, but abrasion resistant to the borehole wall. Examples of suitable materials for the protective cover 52 include steel, preferably with a low content of Mn, or other suitable abrasion resistant materials. The cover can be thin and/or have slots or grooves to reduce its effective thickness.

For example, the slots can be filled with a suitable material which has a low neutron absorption cross section at least in the area covering the region of the window in the shield. The protective cover 52 may be coated with an abrasion resistant coating (not shown) such as tungsten carbide. It should be appreciated that enhancements could be made if the protective material covering the shield, with the exception of the window, contains neutron absorbing material or is coated with such a material. It should be noted that boron carbide ($B_4C$) is very abrasion resistant.

According to an embodiment the cover 52 is constructed such that the material protecting the window section 60 is different from the rest of the cover for assuring maximum neutron reception. Additionally, the amount of material covering the window can be minimized by proper mechanical design. To further improve the neutron transmission, the collar 42 can be made thinner locally at the location of the window in the shielding. While it is simpler to machine a thin section on the outside of the collar 42 and then backfill it with a material having a low neutron scattering and absorption cross section, a further embodiment is indicated in FIGS. 5c and 5d. In FIG. 5d the collar is made thinner from the inside which maximizes the neutron transmission and minimizes neutron scattering.

Figure 6B:
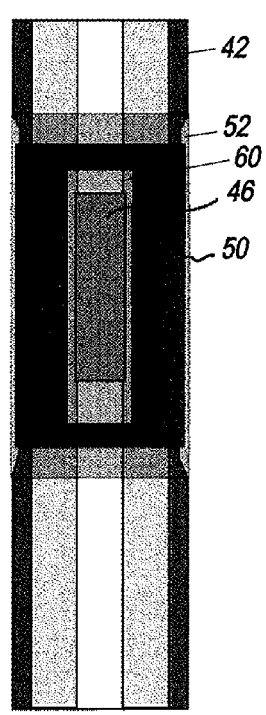
FIG. 6b shows an embodiment of detector shielding recessed and flush with the housing

FIG. 6b shows a further embodiment of the invention in which the neutron shield 50 is recessed into the collar 42 of the tool such that the overlying protective cover 52 has a cross-section which is aligned flush with the rest of the collar that does not surround the detector 46. The shielding is therefore recessed in the housing and flush with it. This avoids a change in the profile of the housing that might impede the mudflow outside the housing.

Figure 6C:
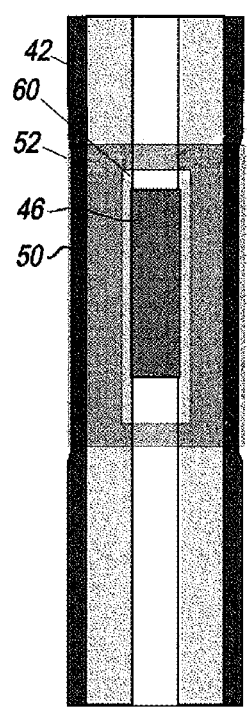
FIG. 6c shows an embodiment of detector shielding in the form of a coat in a shallow recess on the outside of the housing.

FIG. 6c shows yet a further embodiment of the invention in which the neutron shield 50 takes the form of a thin coating on a shallow recess of the collar of the tool. The optional overlying protective cover 52 is capable of having a cross-section that is substantially the same as that of the rest of the tool collar 42 (i.e. where there is no detector 46).

The embodiment in FIGS. 6a and 6b show the profile or cross-section of the tool to be constant over its whole length, which can aid movement of the tool and/or drill string through a borehole with less friction and does not impede the flow of the drilling fluid outside of the tool.

The embodiments show the neutron shield located outside, or embedded in the collar, has a window to allow neutrons from a certain azimuthal angle of the formation to enter the tool and travel to the detector. This increases the azimuthal sensitivity of the neutron measurement tool to the formation.

Figure 7:
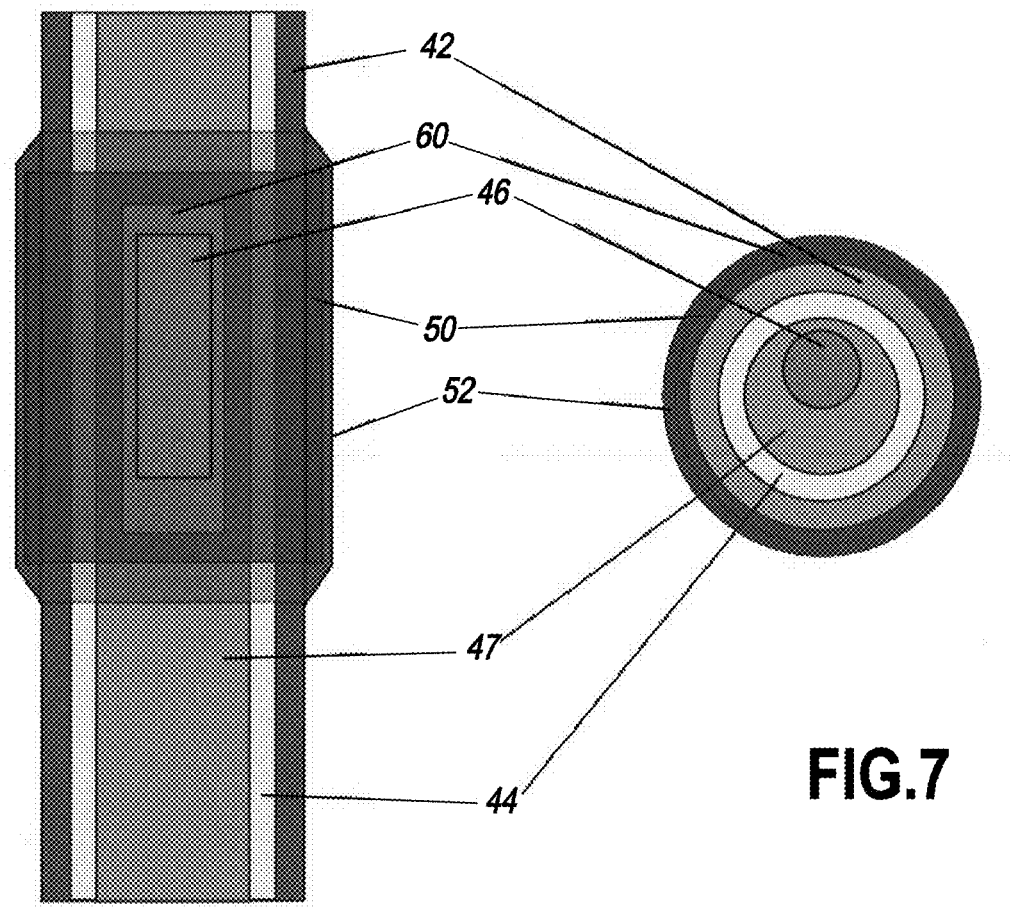
FIG. 7 shows an embodiment of detector shielding outside the housing with a detector surrounded by a mud-channel.

FIG. 7 shows a cross-section and plan view of yet a further embodiment, in which the chassis is centered within and surrounded by the mud-channel. In such a case the external shield embodiment as shown in FIG. 6a may be particularly important in a mandrel LWD tool. Shielding near the detector has limited influence on the azimuthal sensitivity because of the distance to the tool surface. This is illustrated in FIG. 5b, which shows that the focusing is better defined if the outer shielding 50 is at an increased distance from the detector. The embodiment shown in FIG. 7 shows the detector 46 surrounded by the mud-channel 44. The neutron shield 50 is located on the outside of the collar and having a window 60, shown in this embodiment, which will be positioned so as to face onto the formation for azimuthal focusing of the neutrons. The shield 50 lies under a protective cover 52.

It should be appreciated that for all of the embodiments of FIGS. 6a, 6b, 6c and 7 the backshielding of FIG. 4 could be applied to prevent unwanted neutron effects from the mud-channel, although not shown.

The invention is shown as applying to LWD tools. Similar shielding applications could be made to a wireline (or slickline) tool. However, the much reduced housing thickness for wireline applications as compared to the thicker LWD collar, make the shielding arrangement 50 shown for example in the FIG. 7 embodiment less important. Instead the tool could merely be coated, excepting the side facing the formation, with a neutron absorber to enhance the formation sensitivity. An example is shown in FIG. 8.

Figure 8:
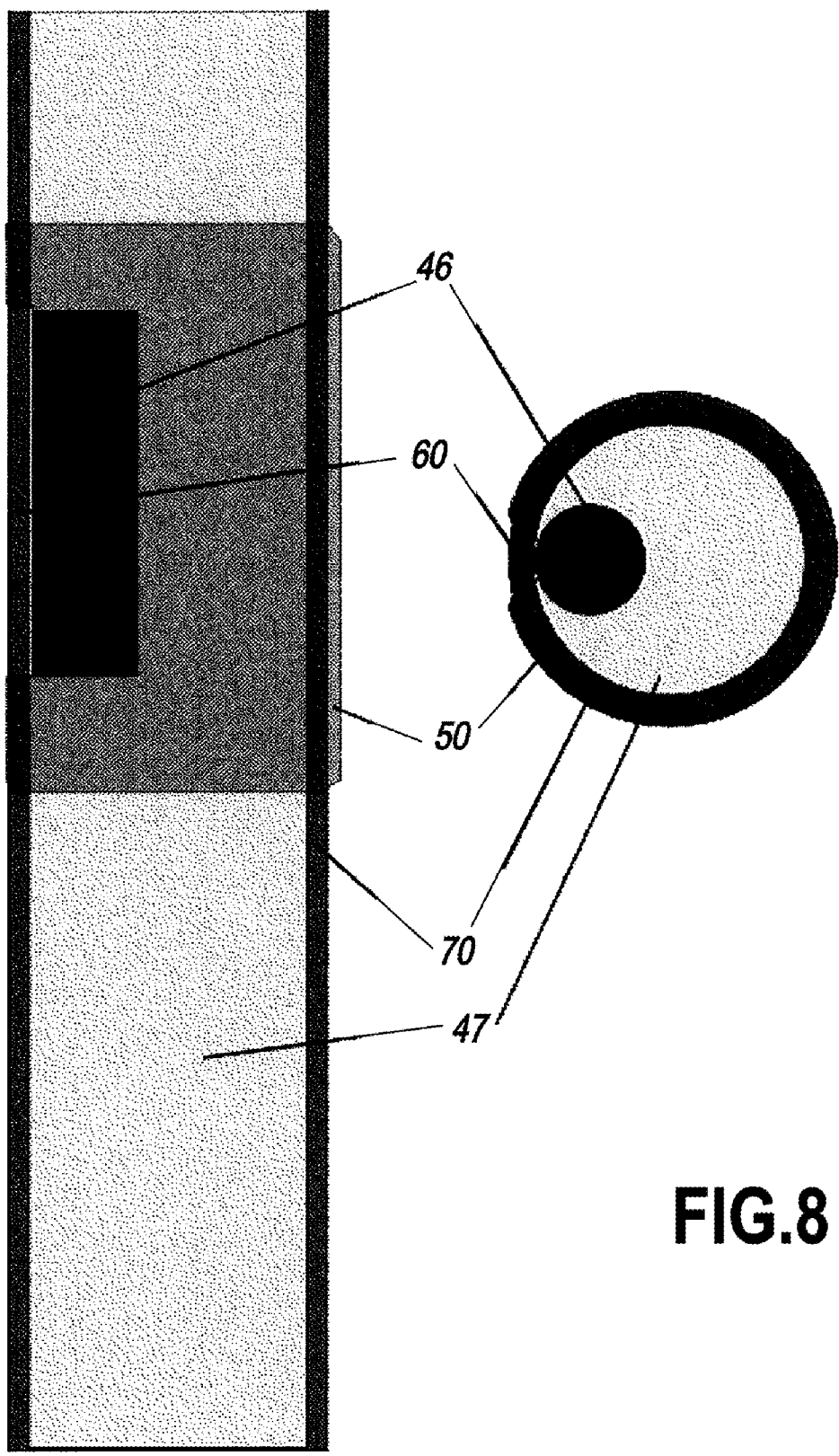
FIG. 8 shows an embodiment of detector shielding with a coating in a wireline application.

That is, FIG. 8 shows an example of a wireline (or slickline) application in which the neutron shield 50 takes the form of a coating on the outer surface of the tool housing 70. There being a window 60 in the coating to receive neutrons from the formation. The wireline tool would be run with an eccentralizing device. The neutron source and protective cover are not shown. This application is also particularly useful if the tool also contains a gamma-ray spectroscopy detector (not shown) and the background from (capture) gamma-rays induced in the tool needs to be minimized.

Figure 9:
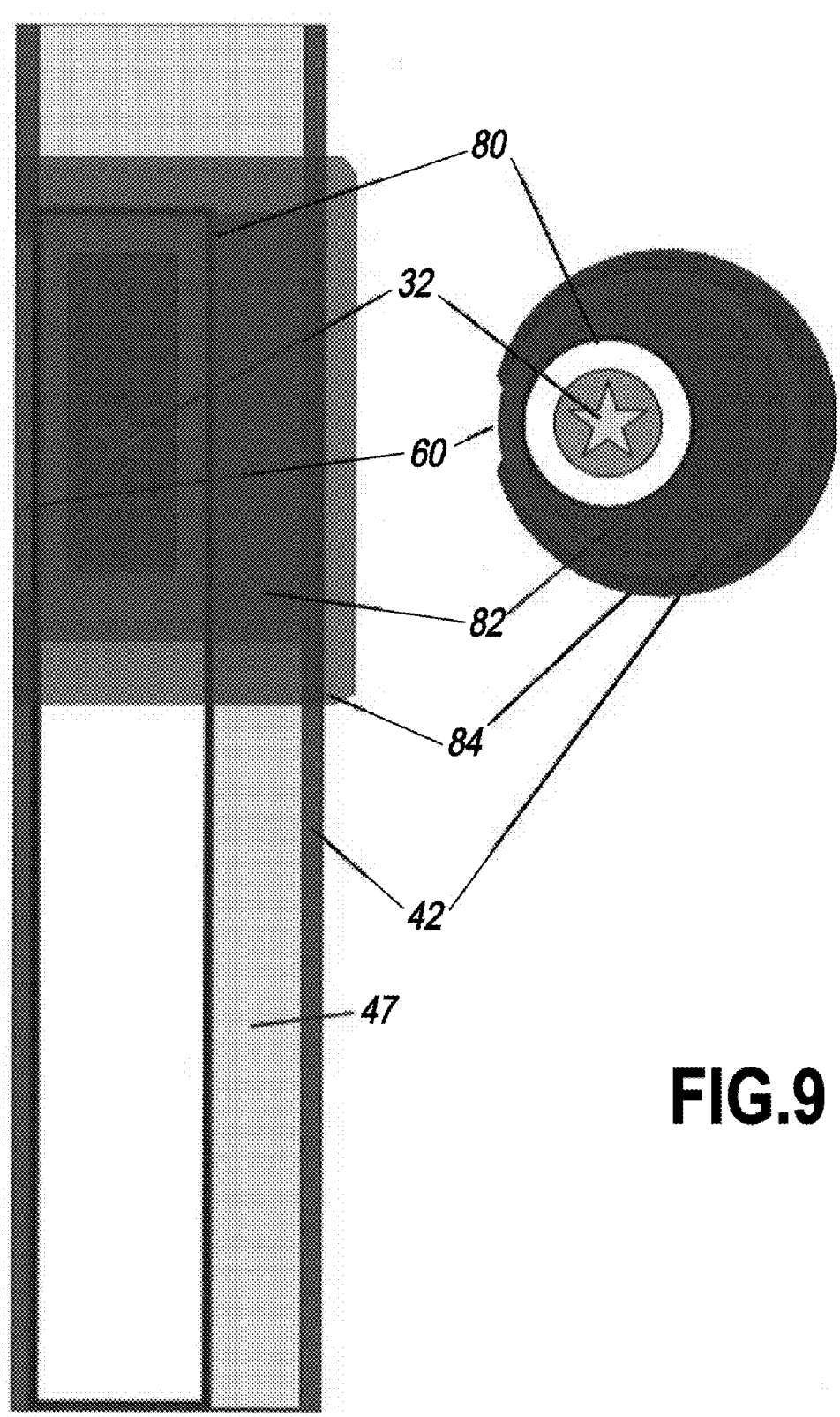
FIG. 9 shows an embodiment of source shielding.

FIG. 9 shows a further embodiment of the invention in which there is shielding around the neutron source 32. The figure shows a neutron source/generator 32 surrounded by a generator housing 80 that is eccentered in the tool to obtain the highest possible unfocused flux toward the formation There is an internal shield 82 located within the housing 42 for reducing neutron flux towards the borehole and there is an outer shield 84 located on the outside of the housing 42.

Thus the internal shield 82 comprises shielding materials to reduce the neutron flux towards the borehole. The neutron flux can be moderated by a shield made from a hydrogenous material and the slow neutrons can be absorbed by neutron absorbers like Li, B, Cd and Gd to name a few. The choice of materials depends on the neutron spectrum and on the importance of the generation of unwanted gamma-rays following the neutron absorption.

Hydrogenous materials would be suitable for most sources with the possible exception of a d-T source (14 MeV). For a high energy 14 MeV source the backshield should contain a material with a large neutron reaction cross section to moderate or eliminate the fast neutrons. For example, oxygen has a large inelastic scattering cross section and can be used to reduce the neutron energy to the point at which hydrogen becomes effective as a moderator. Many isotopes have substantial cross sections for n,p and n,α reactions. These reactions eliminate neutrons in a single step. $^{16}O$ has both reaction channels. The inner shield could therefore be made of a material with a high oxygen density mixed with or surrounded by a moderator (hydrogen). The outer shield could again be used to absorb lower energy neutrons using Boron or a similar material.

Tungsten can be used as a shielding material, if the generation of additional (lower energy) neutrons can be tolerated. The inner shield could be tungsten or a layer of tungsten surrounded by hydrogenous material or hydrogenous material mixed with a neutron absorber.

The outer shield 84 may again contain a neutron absorber. Specifically, the outer shield could be used to absorb the thermal and epithermal neutrons by using absorbers for low energy neutrons (e.g. B, Li, Cd, Gd, . . . ). The preferred material might be Boron enriched in the isotope $^{10}B$, since it has a substantial absorption cross section even for higher energy neutrons.

If no outer shield 84 is used the inner shield 82 needs to be optimized for moderating and absorbing the neutrons by combining the functions of both shields 82, 84.

If no inner shield is used, due to for example geometry and space constraints or placement, then the outer shielding has to be optimized to reduce the flux of fast neutrons. This can be done with materials exhibiting large cross sections for generating charged particles and/or with materials, which do well in moderating the neutron flux. Materials, which increase the number of neutrons, should be avoided.

Thus, while it is preferable to keep shielding very close to the generator (internal) to obtain optimal results, space constraints may make it necessary to add the shielding on the outside. Shielding or focusing to obtain some degree of focusing of high-energy neutrons is different from the shielding required to stop epithermal or thermal neutrons. For 14 MeV sources it is necessary to use high-energy neutron shielding materials with high density and high interaction cross sections. Hydrogen is not very effective at moderating neutrons of this energy. Tungsten, often used to provide axial neutron shielding, may not be the best choice as it also acts as a neutron multiplier. Thus focusing tungsten may not achieve the desired result and other materials are more suited. The choice of materials depends strongly on the energy spectrum of the neutron source and on the available space. Generally speaking the shielding of fast neutrons is very difficult in the typically available space and the optimization needs to be tailored very specifically to the geometry and source type.

Thus, embodiments of the present invention are able to achieve an improved azimuthal focusing by either shielding the source(s) to focus the transmitted neutron flux into the formation, or shield the detector(s) to focus the reception of neutron flux returning from the formation, or even using both focused shielding around the source(s) and detector(s) in the same tool.

It should be appreciated that the focusing of the outgoing neutron beam can also be used to enhance the azimuthal sensitivity of the measurement of neutron induced gamma-rays. Optimal azimuthal sensitivity for measuring neutron induced gamma-rays can be achieved by combining improved directionality of the outgoing neutron flux with directional shielding and focusing of the gamma-ray detector.

It is desirable to increase the directionality of neutron measurement over and above the known eccentering techniques using, for example, the bowspring to achieve better formation sensitivity in wireline or the use of some azimuthal shielding solely inside the tool collar or housing. In an embodiment of the invention, this is achieved using neutron shielding that is specifically located outside of the tool housing or embedded in the housing. This shielding is additional to the axial shielding that prevents the direct passage of neutrons from the source to the detector and any backshielding located within the housing. Various embodiments have been described wherein this additional shielding located embedded in or outside the housing is able to increase formation sensitivity and/or mitigate borehole effects.

It should be appreciated that the window 60 will be strategically located to focus neutron flux in a section of the formation. Thus, the shielding 50 around the detector is likely to face the formation. However, it should be appreciated that the drill bit and tool itself rotates, which the window 60 will at some stage face onto the borehole. This might be particularly useful for an 'imaging' application in which the total surrounding of the tool are determined using the downhole tool. In such an application, it might even be desirable to have a window that is located so as to provide azimuthal focusing onto the actual borehole to detect the effects of the borehole fluid. Thus, multiple detectors having multiple azimuthal windows could be envisaged on the same tool as was shown in FIG. 5e. However, in addition to FIG. 5e, it should also be appreciated that there may be more than one window aligned in the same direction. Thus, there could be an imaging tool having a plurality of detectors providing separate azimuthal focusing into the formation and/or borehole.

It should be appreciated that the shielding embodiments may also be applied to a wireline (or slickline) tool as well as to LWD tools.

The invention claimed is:

1. A downhole tool for performing measurement of a formation, the tool comprising:
 a housing having a source for generating neutrons and a detector for detecting the neutrons; and
 a shield for focusing the neutrons and located outside of, or embedded in, the housing, wherein said shield comprises a neutron absorber, and wherein the housing includes an area of nonzero reduced thickness under the shield.

2. The downhole tool of claim 1, said shield having an opening therein for focusing the neutrons to flow in a direction, wherein the opening is for focusing at least one of the flow of the neutrons from the outside to the detector and from the source to the outside.

3. The downhole tool of claim 1, wherein said neutron absorber is selected from the group consisting of boron, enriched $^{10}$Boron, lithium, enriched $^6$Li, cadmium, gadolinium and mixtures thereof.

4. The downhole tool of claim 1, wherein the neutron shield is embedded in the housing.

5. The downhole tool of claim 4 wherein said neutron shield is a layer comprising at least one neutron absorber embedded in the shield.

6. The downhole tool of claim 1 wherein the shielding is recessed in the housing and is flush with it.

7. The downhole tool of claim 1 wherein the shield is in the form of a thin coating.

8. The downhole tool of claim 7 wherein the tool is a logging while drilling tool including a drill collar and the thin coating is on a shallow recess of the drill collar.

9. The downhole tool of claim 7 wherein the tool is a wireline tool and the thin coating is on the outer surface of the tool housing.

10. The downhole tool of claim 1, wherein the tool further comprises a protective cover.

11. The downhole tool of claim 10, wherein the protective cover comprises boron carbide.

12. The downhole tool of claim 1, wherein the shield comprises a first sub-shielding component located around the source for focusing the neutrons to flow from the source to outside the tool; and
 a second sub-shielding component located around the detector for providing focusing from outside the tool to the detector.

13. The downhole tool of claim 1 wherein the tool further comprises a second shield located inside of the housing between the source and the detector, said second shield comprising at least one material selected from the group consisting of Boron, enriched $^{10}$Boron, lithium, enriched $^6$Li, cadmium, gadolinium and mixtures thereof.

14. The downhole tool of claim 13, the tool further comprising:
 a third shield located inside of the housing between the detector and a mud channel inside of the housing.

15. The downhole tool of claim 1, wherein the source is neutron source and the detector is a gamma-ray detector.

16. A method for focusing neutrons of a downhole tool measuring a formation, the method comprising:
 generating neutrons with a source located in a housing of the tool;
 detecting neutrons with a detector in the housing; and focusing the neutrons with a shield, wherein the shield is located outside of, or embedded in, the housing, said shield having an opening therein for focusing the neutrons to flow in a direction, wherein said shield comprises at least one neutron absorber selected from the group consisting of Boron, enriched $^{10}$Boron, lithium, enriched $^6$Li, cadmium, gadolinium and mixtures thereof, and wherein the housing includes an area of nonzero reduced thickness under the opening.

17. The method of claim 16, wherein the opening in the shield is configured for the focusing of at least one of a flow from the formation to the detector and from the source to the formation.

18. A downhole tool for performing measurement of a formation, the tool comprising:

a housing having a source for generating neutrons and a detector for detecting the neutrons; and an outer shield wherein said shield comprising at least one neutron absorber selected from the group consisting of Boron, enriched $^{10}$Boron, lithium, enriched $^6$Li, cadmium, gadolinium and mixtures thereof, said shield located outside of, or embedded in, the housing and around the source, the outer shield having an opening for focusing neutron flow in an azimuthal direction, and the housing including an area of nonzero reduced thickness under the opening.

19. The downhole tool of claim 18, wherein the tool further comprising:

an inner shield located inside the housing and substantially proximate to the source.

20. A downhole tool for performing measurement of a formation, the tool comprising:

a housing having a source for generating neutrons and a detector for detecting the gamma-rays induced by the neutrons interacting in the formation; and a shield located outside of, or embedded in, the housing and around the source, the outer shield having an opening for focusing neutron flow in an azimuthal direction, wherein said shield comprises at least one neutron absorber selected from the group consisting of Boron, enriched $^{10}$Boron, lithium, enriched $^6$Li, cadmium, gadolinium and mixtures thereof, and wherein the housing includes an area of nonzero reduced thickness under the opening.

* * * * *